United States Patent

[11] 3,612,299

| [72] | Inventors | Stanley B. Shaw<br>Sunol;<br>Ronald H. Gehl, Fremont, both of Calif. |
|---|---|---|
| [21] | Appl. No. | 12,351 |
| [22] | Filed | Feb. 18, 1970 |
| [45] | Patented | Oct. 12, 1971 |
| [73] | Assignee | C. T. Supply Co.<br>Fremont, Calif. |

[54] PALLETIZER FOR CANS
16 Claims, 7 Drawing Figs.

[52] U.S. Cl. ........................................................... 214/6 N,
214/6 P, 53/159
[51] Int. Cl. ........................................................ B65g 57/20
[50] Field of Search ............................................ 214/6 P, 6
FS, 6 DK, 6 M, 6 N, 6 H; 53/159

[56] References Cited
UNITED STATES PATENTS

| 2,470,795 | 5/1949 | Socke | 214/6 N X |
| 3,219,203 | 11/1965 | Jeremiah | 214/6 N X |
| 3,522,890 | 8/1970 | Birchall | 214/6 P |

Primary Examiner—Gerald M. Forlenza
Assistant Examiner—Robert J. Spar
Attorney—Joseph B. Gardner ABSTRACT: A palletizer for organizing a mass of containers in the form of open metal cans continuously delivered thereto by an infeed conveyor into ordered rows, and for stacking the ordered rows of containers layer by layer onto a pallet therefor. The pallet is removably supported upon a vertically reciprocable elevator operative to lower the pallet progressively step by step so that the successive layers of containers can be stacked one upon another. The palletizer is operative to offset or stagger the vertically aligned rows of successive layers; and to effect this result it includes transversely reciprocable stop structure having alternate ridges and grooves which define the outer ends of the container rows in each layer, transversely reciprocable interrupter structure that defines the terminal ends of the rows, and plungers forming a part of the interrupter structure which are selectively movable between extended operative and retracted inoperative positions so as to be engageable with certain of the containers advanced theretoward by the conveyor and constrain such containers to terminate the rows thereof forming any particular layer.

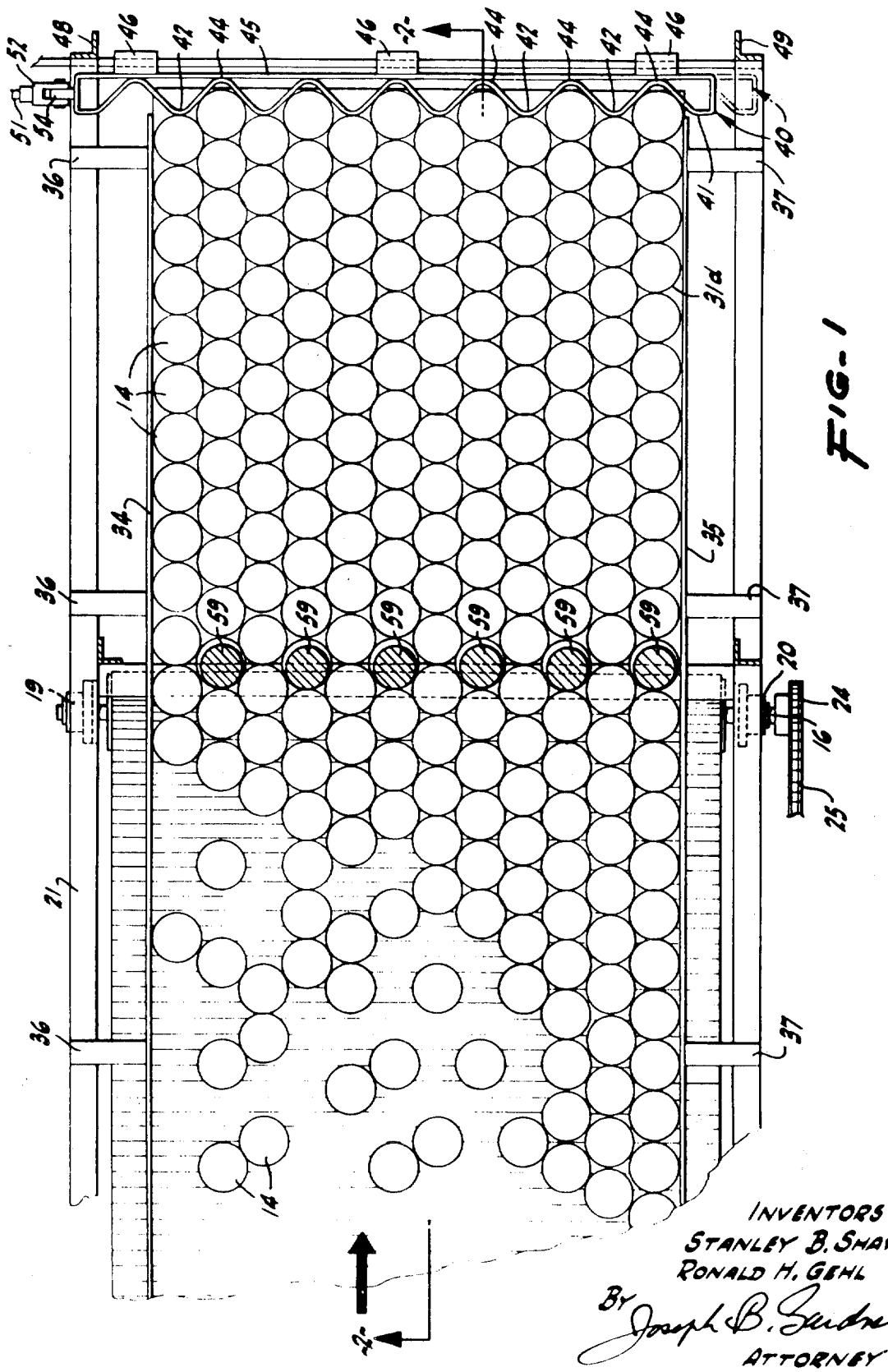

PATENTED OCT 12 1971 3,612,299
SHEET 2 OF 3
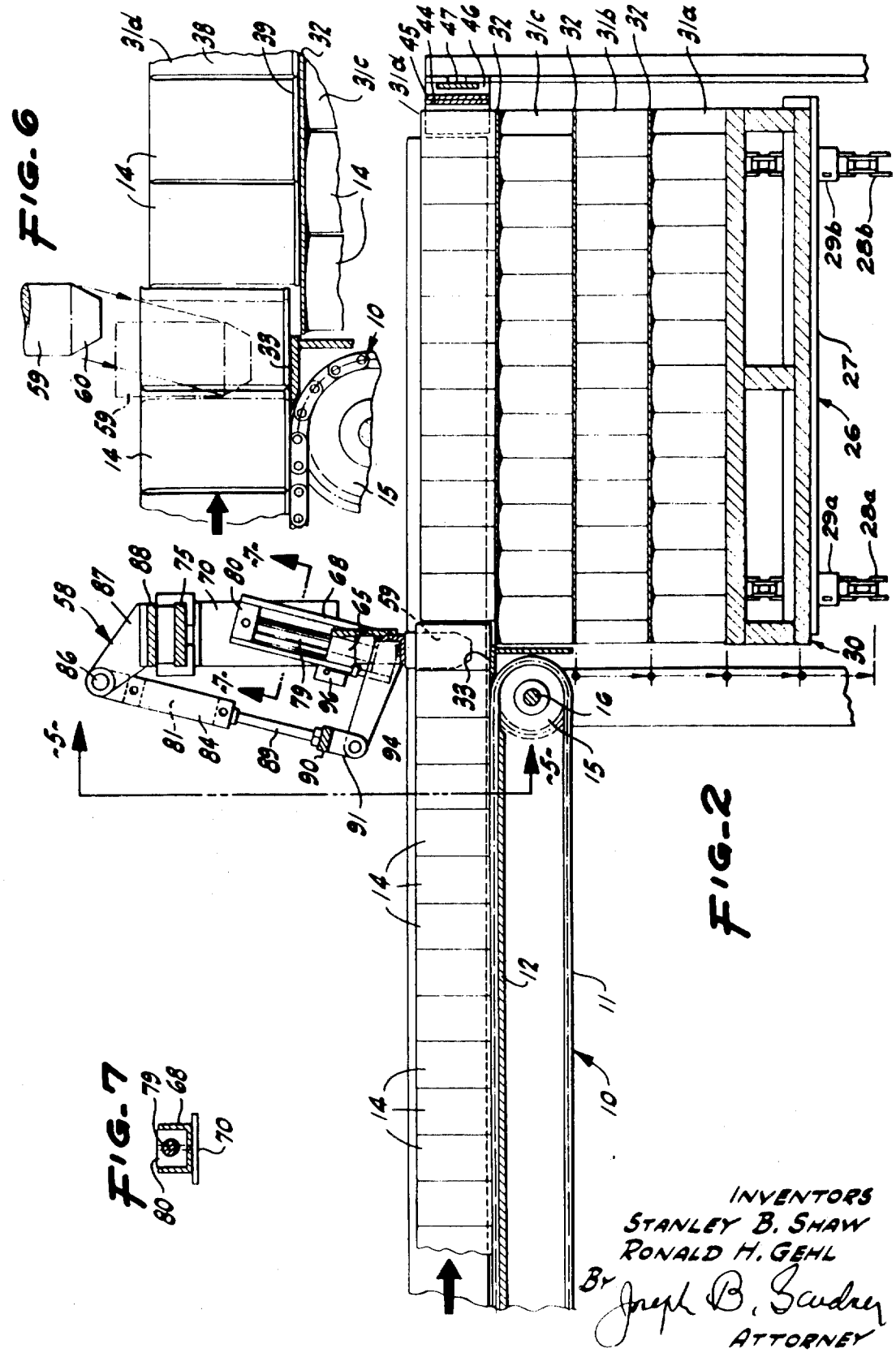
INVENTORS
STANLEY B. SHAW
RONALD H. GEHL
By Joseph B. Saudrey
ATTORNEY

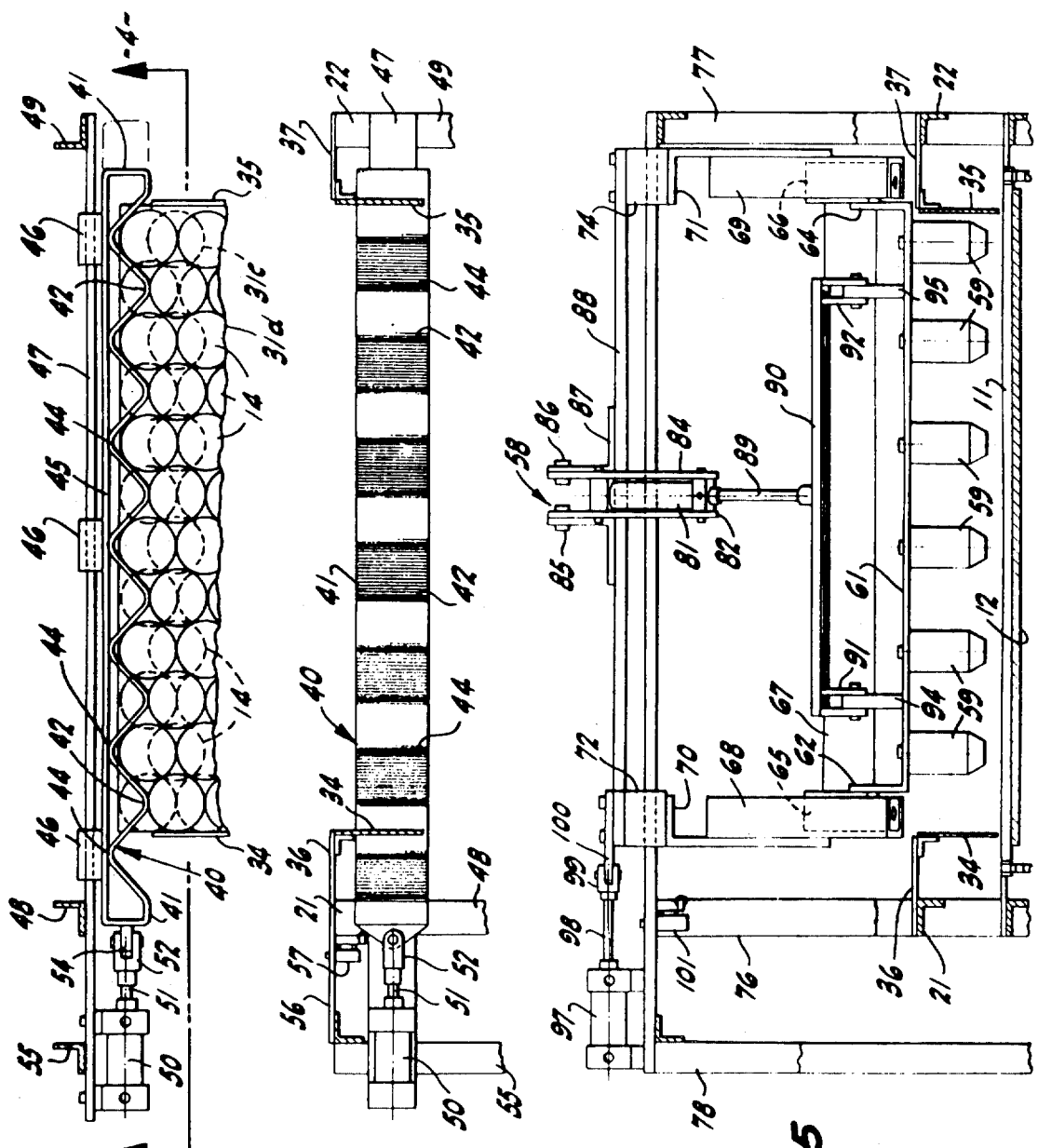

PALLETIZER FOR CANS

This invention relates to palletizer apparatus and, more particularly, to a palletizer for organizing a mass of containers, such as open metal cans, continuously delivered thereto by an infeed conveyor into longitudinally extending, transversely adjacent rows of containers adapted to be stacked layer by layer onto a pallet therefor. In factories in which metal containers of the type used for packaging food products and the like for retail sale (which containers are commonly referred to as cans or tin cans) are made, it is customary to close each container only at one end leaving the other end open to enable the container to be filled with the product to be sold therein. Since the open containers may not be immediately used, and are not necessarily used at the place of their fabrication, they are ordinarily assembled into large packages for shipment and storage, and such assembly and packaging is effected for the most part by machinery called palletizers.

The name palletizer is generally descriptive of the function performed by such machinery in that the purpose thereof is to assemble a mass of containers delivered thereto into ordered rows upon a support or base known as a pallet. Such pallets are relatively large although the precise size thereof will depend upon the particular containers to be supported thereon. By way of example, a typical pallet may have a size of the order of 4 feet by 5 feet so as to accommodate 12 to 14 longitudinally and transversely oriented rows of containers arranged in layers one upon another constituting, perhaps, 10 layers in height. Pallets are delivered to the palletizer at the rate required for use thereat, and it is now common to supply pallets by means of mechanism referred to as a downstacker which is operative to deliver pallets one by one to a conveyor that transports the same to the palletizer machinery. An example of a preferred downstacker is disclosed in the copending patent application of Stanley B. Shaw entitled "Pallet Storage And Delivery Mechanism," Ser. No. 867,776, filed Oct. 20, 1969.

It is well known that in a container palletizer of the type being considered, the number of containers that can be accommodated by any loaded pallet may be increased by about 12 percent if the containers are offset row by row rather than all being precisely aligned. This fact is apparent when it is considered that such containers generally are cylindrical and that if precisely aligned, the large open space defined between any four abutting containers is completely unuseable and, therefore, is lost as respect its availability for the receipt of containers therein. On the other hand, offsetting the containers row by row utilizes such space with the result that the only loss of space is adjacent one end of each row of containers.

Palletizer apparatus to accommodate such offsetting of the containers is available but is structurally complex, difficult to adjust, operates at relative low speeds, and presents significant maintenance problems. Broadly stated, then, a general object of the present invention is to provide an improved palletizer that obviates many of the disadvantages inherent in prior art apparatus of this type.

Another object of the invention is that of providing improved palletizer that is much less complex structurally than prior art apparatus and requires no bypass to return or recycle a complete row of containers from palletizer to the infeed conveyor because of the inability of the palletizer to utilize all of the container rows formed along the conveyor, and which also eliminates the requirement for a reciprocable carriage located along the infeed conveyor for collecting the containers in rows and for then bodily displacing a layer of rows onto the pallet support therefor. As respects this latter feature, in the present invention the movement of the infeed conveyor itself is utilized to displace containers therefrom layer by layer onto the pallet support.

Still another object is in the provision of an improved palletizer that is readily adjusted to accommodate containers of different size, and that is also capable of operating at high speeds relative to conventional palletizers as, for example, speeds of the order of 1,400 containers per minute as against speeds of from 600 to 800 containers per minute in conventional palletizers.

Additional objects and advantages of the invention, especially as concerns particular features and details thereof, will become apparent as the specification continues.

An embodiment of the invention is illustrated in the accompanying drawings in which:

FIG. 1 is a broken top plan view of a palletizer embodying the present invention, the palletizer being shown with a plurality of containers stacked upon a pallet supported thereby;

FIG. 2 is a broken longitudinal sectional view taken along the line 2—2 of FIG. 1;

FIG. 3 is a broken top plan view of the stop mechanism located adjacent the outer end of the palletizer;

FIG. 4 is a transverse sectional view taken generally along the line 4—4 of FIG. 3 but with the containers removed;

FIG. 5 is a broken vertical sectional view taken generally along the line 5–5 of FIG. 2;

FIG. 6 is an enlarged, broken side view in elevation of a portion of the interrupter mechanism shown in FIG. 2; and FIG. 7 is a fragmentary sectional view taken along the line 7—7 of FIG. 2.

As stated hereinbefore, palletizers are generally old and well known, and the use thereof is old in factories in which metal containers of the type commonly referred to as cans or tin cans are fabricated and which provides the setting for the present invention. Accordingly, the overall mechanical environment illustrated in the drawings is known, and those portions of the total apparatus which are of conventional design will be described only briefly and for the purpose of showing the overall function of the palletizer and interrelationship of the inventive subject matter with that which is old.

Proceeding on this basis, it may be said that the palletizers are used for organizing a mass of containers continuously delivered thereto by an infeed conveyor into ordered rows that are stacked layer by layer onto a pallet therefor. The pallet is removably supported upon a vertically reciprocable elevator operative to lower the pallet thereon progressively step by step from an elevated starting position to a lower discharge position so that successive layers of ordered rows of containers can be stacked one upon another. The infeed conveyor used to deliver containers may be conventional and can take any usual form. In the apparatus illustrated, the conveyor is denoted in its entirety with the numeral 10 and it includes an endless belt 11 that, in the usual instance, will be a flexible wire mesh belt. Along its upper container-supporting reach, the belt 11 traverses and is supported by a planar platform 12 so that the mass of containers 14 being advanced by the belt 11 in the direction of the arrow (i.e., toward the right) will not cause the belt to sag.

The belt 11 is entrained at one end about a drum or roller 15 that extends transversely and is equipped with a horizontally disposed axle 16 journaled for rotation adjacent the opposite ends thereof in bearings 19 and 20 that are respectively carried along the opposite sides of the apparatus in frame members 21 and 22. The shaft 16 projects outwardly beyond the frame member 22 and is equipped thereat with a pulley wheel or sheave 24 having a drive belt 25 entrained thereabout. The opposite end of the conveyor 10 is not illustrated since the conveyor in its entirety may be old, and it will be apparent that the drivebelt 25 (powered by an electric motor otherwise) causes the roller 15 to rotate in a clockwise direction, as viewed in FIG. 2, so as to cause the belt 15 to advance the mass of containers 14 from left to right, as seen in both FIGS. 1 and 2.

The elevator associated with the apparatus is designated in its entirety with the numeral 26; and it includes a platform defined along one side by a longitudinally extending L-shaped channel 27 connected adjacent its opposite ends to longitudinally spaced elevator chains 28a and 28b by means of lugs 29a and 29b fixedly secured thereto. Along its opposite side, the platform is similarly defined by a channel carried by elevator chains and lugs, none of which are shown. The elevator 26 is old and well known in the art and further details thereof need not be set forth, it being appreciated that each set of chains 28 is driven by sprockets mounted upon a common shaft energized by a gear head brake motor which, when lowering a pallet 30 is controlled by a photoelectric cell that establishes the distance of each downward step of the pallet in response to the height of the particular cans being palletized as measured by the cell. The two sets of elevator chains are synchronized in such standard elevator design by a cross-shaft gear connected to the two sprocket drive shafts.

The platform channels 27 at the lowermost position, not illustrated, are adapted to have an empty pallet 30 delivered thereto by conveyor mechanism (not shown but see, for example, the aforementioned application Ser. No. 867,776), and thereafter to have the filled pallet removed therefrom after containers have been stacked thereon in successive vertical layers.

After an empty pallet 30 has been placed upon the platform channels 27, the lift mechanism elevates the pallet into its uppermost position in which the top surface thereof pallet is generally aligned horizontally with the conveyor belt 11. When in such position, the first layer 31a (see FIG. 2) of containers is received thereon. Thereafter, the platform 27 is lowered one step which corresponds approximately to the vertical dimension of the containers 14, a separation sheet 32 (which may be a sheet of clipboard or cardboard) is placed over the layer 31a, and the next successive layer 31b of containers is advanced thereonto from the conveyor 10. The elevator 26 is lowered the next successive step, another separation sheet 32 is placed over the layer 31b, and the next successive layer 31c is advanced thereonto from the conveyor.

This procedure is repeated until the elevator 26 has descended into its lowermost position at which time the pallet 30 will have a substantial number of layers 31 stacked thereon (10 for example), and it will be removed from the elevator platform 27 so that another empty pallet 30 may be placed thereof and raised into the upper starting position and loaded layer by layer in the manner described. The containers 14 may be delivered by the belt 11 over a rigid lip 33 at the terminal edge of the conveyor, as shown in FIGS. 2 and 6.

It may be observed that the mass of containers 14 advanced by the conveyor 10 is confined transversely between a pair of guide rails 34 and 35 (FIG. 1) that extend along the conveyor and at their forward ends project outwardly and over the loading station defined by the elevator 26. The guides 34 and 35 are respectively supported by the frame members 21 and 22 via a plurality of brackets 36 and 37 that are spaced apart longitudinally. As respects the present invention, the pallets 30 may be conventional and in the form shown, are wooden pallets (details thereof may be found in the aforementioned copending patent application of Stanley B. Shaw). The containers themselves are also conventional and as is seen most clearly in FIG. 6, they are hollow, have cylindrical sidewalls 38, are open at their upper ends, and are closed at their lower end by end closures sealingly related to the sidewalls 38 and each forming a bead or lip 39 that is circumferentially extending and projects laterally outwardly from the container at the lower end thereof.

The size of the pallets 30 and the spacing between the guide rails 34 and 35 are such that each layer 31 of containers comprises 12 longitudinally extending rows disposed in side by side juxtaposition. As shown best in FIG. 1, each such row comprises 11 containers oriented one after another in abutting relation, nd the adjacent rows are offset longitudinally or staggered. As will become more apparent hereinafter, the staggered rows are alternated from layer to layer, as is seen in FIG. 2. The precise number of rows and the quantity of containers in each row are intended to be exemplary, and can be readily changed to fit the requirements of any particular container size or environment.

Referring now to FIGS. 1, 3 and 4 in particular, it will be seen that stop mechanism generally denoted with the numeral 40 is located adjacent the outer end of the elevator 26 and any pallets 30 supported thereon. The stop mechanism 40 includes a transversely disposed stop structure 41 having a plurality of transversely alternate, longitudinally offset ridges 42 and valleys 44 respectively adapted to be engaged by the leading containers in each layer 31 thereof, as shown in FIGS. 1, 2 and 3. In the form illustrated, the stop structure 41 is continuous or uninterrupted and is essentially corrugated in configuration.

The stop structure 41 is transversely reciprocable between first and second positions respectively shown by full lines and broken lines in FIG. 1. Such positions correspond to the center to center spacing between transversely adjacent rows of containers, and the two positions of the stop structure are used to permit the staggered relationship of the adjacent rows of containers to be alternated from layer to layer of any stack thereof supported upon a pallet 30. The stop structure 41 may be a continuous strip of material corrugated along one side thereof so as to form ridges 42 and valleys 44, and substantially flat along the other side or back wall 45 thereof which is equipped at transversely spaced locations therealong with outwardly extending bearing sleeves 46 that are slidably mounted upon a support bar 47 fixed at its ends to L-shaped channels 48 and 49 forming a part of the frame structure of the apparatus.

Means are provided for selectively displacing the stop structure 41 between the first and second positions thereof, and in the particular apparatus being considered, such means constitutes motor means in the form of fluid piston-cylinder structure that includes a cylinder 50 fixedly secured to the bar 47 and a piston rod 51 equipped at its outer end with a bifurcated coupling 52 pivotally secured to a connector link 54 welded or otherwise rigidly related to the stop structure 41. The fluid motor means may be either hydraulically or pneumatically energized, and may be a double-acting motor so that the stop structure is positively displaced in each direction between the two positions thereof. Taking the condition of the stop structure 41 shown in FIG. 3, when the motor means 50, 51 is energized, the piston rod 51 will be displaced outwardly or toward the right whereupon the stop structure will be displaced into the second position thereof shown by broken lines in this Figure. Then, after the next successive layer of containers is stacked upon the pallet 30, the motor means 50, 51 will be energized in the opposite direction so as to retract the rod 51 and thereby return the stop structure 41 to the first position thereof shown by full lines in this Figure.

As illustrated in FIG. 4, the frame members 21, 48 project slightly above the upper extremity of the stop structure 41, and the member 48 is paralleled by a second L-shaped channel member 55 which also extends above the stop structure. Bridging the frame members 48 and 55 and rigidly secured thereto is a mounting strap 56 that carries intermediate the frame members a limit switch 57 having an actuator adapted to be engaged by the stop structure 41 when displaced into the first position thereof, as shown in FIG. 4. The limit switch 51 may be completely conventional, nd it functions in the ordinary manner to sense movement of the stop structure 41 into such first position thereof and to effect energization of an electric control circuit in response thereto. Such control circuit in response to actuation of the switch 57 causes sequential operation of other mechanisms of the apparatus, as will be described hereinafter. However, it may be noted that the control circuitry may be completely conventional and for this reason, is not illustrated nor will it be described in detail.

The apparatus also includes interrupter mechanism generally denoted with the numeral 58 and shown particularly in FIGS. 2, 5, 6 and 7. The mechanism 58 is located adjacent the inner end of the elevator 26 and any pallet 30 supported thereon, and it is positioned in general alignment vertically with the terminal end of the conveyor 10. The interrupter mechanism 58 includes a plurality of plungers or stop fingers 59 that are spaced apart transversely by a distance substantially equal to the center to center spacing between alternate rows of containers, as is most evident in FIG. 1. The plungers 59 are generally cylindrical and have a somewhat smaller outer diameter than the inner diameter of the containers 14, as is evident in FIG. 1, so as to be insertable thereinto. Further, each plunger 59 has an inverted, generally frustoconical lower end 60 to facilitate insertion thereof into a container 14.

The plungers 59 are bolted to the base 61 of a generally U-shaped support channel, as shown in FIG. 5. The outwardly extending legs 62 and 64 of such support channel are respectively secured in a fixed relation to reciprocable bearings 65 and 66 disposed adjacent the ends of the U-shaped support and also connected to each other by a transversely extending tie bar 67. Accordingly, the bearings 65 and 66 are structurally interconnected and are constrained so as to reciprocate in mechanically enforced synchronism.

The bearings 65 and 66 are respectively supported for such reciprocable displacements in U-shaped guides 68 and 69 which in turn are fixedly secured to inverted generally L-shaped hangers 70 and 71, respectively, that are attached to and depend from bearing blocks 72 and 74. The bearing blocks are slideably mounted upon a support bar 75 fixedly carried by a plurality of frame members 76, 77, and 78. As shown best in FIG. 2 which illustrates the hanger 70 and U-shaped guide 68, the guides are angularly disposed relative to the hangers 70 and extend downwardly and rearwardly and have an angular disposition approximating 30° relative to a true vertical line in one specific embodiment of the invention. Further considering the guide 68 and hanger 70 to wh which it is attached, the associated bearing 65 has a central opening therethrough that slideably receives a guide pin 79 centered with respect to the guide 68, as shown best in FIG. 7. The pin 79 at its upper end is fixedly secured to a mounting block 80 that is bolted or otherwise rigidly attached to the guide 68. The U-shaped guide 69 is similarly provided with a guide pin, not shown. Although the guides 68 and 69 and guide pins respectively associated therewith are angularly disposed so that the bearings 65 and 66 are reciprocable along inclined but generally vertical axes, the plungers 59 and U-shaped support 61 that carries the same have a substantially vertical disposition corresponding essentially to that of the hangers 70 and 71.

As shown best in FIG. 6, the plungers 59 and structural components associated therewith, as heretofore explained, are reciprocable along such generally vertical axes between upper retracted and lower extended positions respectively shown by full lines and broken lines in such figure. In their lower extended positions, the plungers 59 are engageable with certain of the containers advanced theretoward by the conveyor 10, as shown in FIGS. 1 and 2, and thereby constrain such engaged containers and the entire mass thereof being advanced by the conveyor against movement beyond the plungers. In their upper retracted positions shown by full lines in FIG. 6, the plungers 59 are above the elevation of the containers 14 and permit the same to pass thereunder to form a layer 31 of containers supported upon the pallet 30.

Means are provided for selectively displacing the plunger 59 between the extended and retracted positions thereof, and in the particular apparatus being considered such means constitutes motor means in the form of pneumatically energized piston-cylinder structure comprising a cylinder 81 pinned or otherwise attached to and intermediate a pair of transversely spaced links 82 and 84 that at their upper ends are pivotally supported by pins 85 and 86, respectively extending through the spaced legs of a bifurcated support bracket 87 bolted or otherwise rigidly secured to a transversely extending tie bar 88 bolted adjacent the opposite ends thereof to the aforementioned bearings 72 and 74. The cylinder 81 contains a piston (not shown) equipped with a rod 89 bolted or otherwise fixedly attached at its lower end to a transverse support 90 equipped at the opposite ends thereof with bifurcated couplings 91 and 92. Pivotally secured at their outer ends to the coupling 91 and 92 are a pair of arms 94 and 95, respectively, that are rigidly attached to the U-shaped support 61, 62, 64 that carries the plunger 59.

The motor means 81, 89 is a double-acting motor so that the plungers 59 are positively displaced in each direction between the upper retracted and lower extended positions thereof. As viewed in FIGS. 2 and 5, the plungers 59 are in their lower extended positions, and in such positions thereof are effective to interrupt the movement of containers 14 from the conveyor 10 and onto the pallet 30. When the motor means is energized, the plungers 59 will be elevated to their retracted positions, thereby permitting a layer of containers to be advanced over the underlying pallet so as to be stacked thereon either directly or upon a preceding layer. It will be observed in FIG. 2 that a limit switch 96 is mounted upon the guide 68 and has an actuator located so as to be tripped by downward displacement of the bearing 65, as shown in this Figure. As in the case of the limit switch 57, the switch 96 may be conventional and the function thereof is to detect downward displacement of the plungers 59 and effect certain changes in control circuitry that includes the switch 96 as a component thereof.

As indicated hereinbefore, the interrupter structure is transversely reciprocable between first and second positions the distance between which corresponds to the center to center spacing between transversely adjacent rows to be alternated layer by layer. The means for selectively displacing the interrupter structure between such first and second position thereof includes motor means in the form of piston-cylinder structure which may be hydraulically or pneumatically energized. Such motor means includes a cylinder 97 mounted upon the aforementioned support bar 75 adjacent the frame members 76 and 78. The reciprocable piston (not shown) mounted within the cylinder 97 is equipped with a rod 98 connected by a bifurcated coupling 99 to a connector link 100 bolted to both the tie bar 88 and bearing 72 at their interconnection. As in the case of the previously considered motor means, the motor means 97, 98 may be double acting so that the interrupter mechanism is positively displaced in each direction between the first and second positions thereof.

Assuming the position of the interrupter mechanism illustrated in FIG. 5, after the plungers 59 have been elevated into their retracted position, the motor means 97, 98 will be energized and the rod 98 will be displaced inwardly relative to the cylinder 97 or toward the left as viewed in FIG. 5. Accordingly, the plunger 59 (see FIG. 1) closest the guide 34 will then be in line with the row of containers that are abutting the guide 34. Following the next cycle of operation in which the interrupter mechanism has been displaced downwardly and then elevated while remaining in such second position thereof, the motor means 97, 98 will be reversely energized so as to return the interrupter mechanisms to the first position thereof shown in the drawings in which the plunger 59 adjacent the guide 35 is aligned with the row of containers in abutment therewith.

It will be observed in FIG. 5 that a limit switch 101 is secured to the support bar 75 in general alignment with the frame members 76, and it has an actuator triggered by displacement of the interrupter mechanism toward the left into the second position thereof. In the form shown, the movable actuator of the switch 101 is engaged by the hanger 70, and thereby senses movement of the interrupter mechanism into such second position and effects changes in the control circuitry in response thereto.

The palletizer apparatus can be made as automatic as desired because the motions and functions effected thereby are precise and distinct, thereby being highly susceptible of automation. In the specific embodiment of the invention being considered, the palletizer apparatus is semiautomatic in the sense that each cycle of operation if initiated manually by an operator who depresses a cycle-energizing switch in the control circuitry of the apparatus. The cyclic operation of the apparatus is initiated whenever a complete layer of containers is in position above a pallet 30, as shown in both FIGS. 1 and 2, and usually when a sufficient mass of containers 14 is backed-up along the conveyor 10 so as to constitute at least one complete additional layer for subsequent displacement by the conveyor (the endless belt 11 of which ordinarily runs continuously) into position above the pallet 30 during the next cycle of operation. Thus, in the configuration of the apparatus shown in FIG. 1, the operator might wait until additional containers 14 are backed-up upon the conveyor belt 11 before initiating a cycle of operation.

Considering an overall operational cycle and assuming that the stop structure 40 and the plungers 59 of the interrupter mechanism 58 are both in the first positions thereof shown, and that the plungers 59 are in their retracted elevated positions, when the operator actuates the cycle-energizing switch the plungers 59 will move downwardly toward their extended operative positions in which they respectively enter the containers 14 positioned therebelow in general alignment with the lip 33 and essentially seated thereon. The plungers 59 move rearwardly as well as downwardly because of the angular orientation of the bearing shaft 79, as heretofore explained, and as a consequence the plungers 59 displace such containers into which they are inserted rearwardly along the conveyor belt 11 so as to separate the laterally extending beads 39 of the last transversely extending row of containers in the layer thereof supported by the pallet 30 from the beads 39 of the transversely extending row of containers then engaged by the plungers and which will form the first row of containers in the next successive layer thereof. Accordingly, no interlocking of the beads 39 will occur when the layer of containers then supported by the pallet is displaced downwardly relative to those supported on the conveyor.

Downward movement of the plungers 59 into their extended operative positions causes the limit switch 96 to be actuated and in response thereto, the hydraulic mechanism controlling the position of the elevator 26 and pallet 30 supported thereon is energized so as to displace the elevator downwardly one step and thereby prepare the pallet 30 for receipt of the next successive layer thereon. In response to means (not shown) associated with the elevator 26, after it has descended one step, the motor means 50, 51 associated with the stop mechanism is energized to displace the stop structure 41 into the second position thereof which causes the switch 57 to be released whereupon the control circuitry is made operative to cause the motor means 81, 89 to be energized to elevate the plungers 59 into their upper retracted positions. As a result of such movement of the plungers 59, the switch 96 is released and the control circuitry is thereby conditioned to cause the motor means 97, 98 to displace the interrupter mechanism into the second position thereof.

It will be evident that as soon as the plungers 59 are elevated, the motion of the conveyor belt 11 will cause the mass of containers 14 supported thereon to be advanced over the lip 33 and onto the underlying layer of containers then supported above the pallet 30 (a separation sheet 32 having been placed thereover). Such successive layer of containers will have the longitudinally extending rows of containers offset with respect to those of the underlying layer because the ridges 42 and valleys 44 of the stop structure 40 will have had their relative positions interchanged. Similarly, when the plungers 59 are then displaced into their extended operative positions, they will cooperate with the ridges and valleys of the stop structure 40 in such a manner as to define the requisite offset of the rows of containers for layer to layer. In this respect, it may be observed that the plungers 59 are respectively aligned with valleys 44 of the stop structure 40 irrespective of whether the stop structure and plungers are in the first or second positions thereof. Thus, whenever a particular row of containers is longer at the forward end thereof then the contiguous rows of containers on each side thereof, it must be correspondingly shorter at its trailing end which is effected by the alignment of the plungers 59 with the valleys 44.

The palletizer is structurally simple and capable of operating at high speeds, and because of its simplicity, maintenance requirements are very low even considering the processing speeds attainable which may double those of ordinary apparatus. It is also readily adjustable to accommodate containers of different size and in this respect, the transverse width of the apparatus can be increased or decreased by changing the transverse spacing between the guides 34 and 35, and the longitudinal extent of the layers of containers accommodated by the apparatus can be changed by shifting the position of the stop mechanism along the supports therefor.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a palletizer for organizing a mass of containers continuously delivered thereto by an infeed conveyor into ordered rows and for stacking the same layer by layer onto a pallet therefor removable supported upon a vertically reciprocable elevator operative to lower such pallet progressively step by step so that successive layers can be stacked one upon another, transversely disposed stop structure located adjacent the outer end of said elevator and any pallet supported thereon and having a plurality of transversely alternate longitudinally offset ridges and valleys adapted to be engaged by such containers and enforce thereon longitudinal staggering of transversely adjacent rows, said stop structure being transversely reciprocable between first and second positions corresponding to the center to center spacing between transversely adjacent rows of containers to enable the aforesaid staggering of adjacent rows to be alternated layer by layer, means for selectively displacing said stop structure between the first and second positions thereof, transversely disposed interrupter structure located adjacent the inner end of said elevator and any pallet supported thereon in general alignment with the terminal end of said conveyor and having a plurality of plungers spaced apart transversely by the center to center spacing between alternate rows of containers, said interrupter structure being reciprocable between extended and retracted positions and in the extended positions thereof being engageable with certain of the containers advanced theretoward by said conveyor to constrain such certain containers and the entire mass thereof being advanced by said conveyor from movement therepast, said interrupter structure also being transversely reciprocable between first and second positions corresponding to the center to center spacing between transversely adjacent rows of containers to enable the aforesaid staggering of adjacent rows to be alternated layer by layer, means for selectively displacing said interrupter structure between the extended and retracted positions thereof, and means for selectively displacing said interrupter structure between the first and second positions thereof.

2. The palletizer of claim 1 in which said plungers are also movable longitudinally between rearward and forward positions respectively corresponding to the extended and retracted positions thereof so as to displace any such constrained containers and mass thereof being advanced by said conveyor rearwardly and separate the same from any layer of containers then supported by a pallet forwardly of said plungers.

3. The palletizer of claim 2 in which means are provided that support said interrupter structure for reciprocable displacement between the aforesaid extended and retraced positions such that said plungers transverse generally vertical axes that are longitudinally inclined so that said plungers move downwardly and rearwardly into their extended positions to displace such mass of containers rearwardly as aforesaid.

4. The palletizer of claim 3 in which each of said plungers has a tapered lower end to facilitate insertion thereof into such container.

5. The palletizer of claim 2 in which said plungers are respectively aligned longitudinally with valleys of said stop structure.

6. The palletizer of claim 5 in which said stop structure and interrupter structure are movable transversely in opposite directions relative to each other in being displaced between the first and second positions thereof.

7. The palletizer of claim 1 in which said plungers are respectively aligned longitudinally with valleys of said stop structure, and in which said stop structure and interrupter structure are movable transversely in opposite directions relative to each other in being displaced between the first and second positions thereof.

8. The palletizer of claim 1 in which each of said plungers has a tapered lower end to facilitate insertion thereof into such container.

9. The palletizer of claim 8 in which said plungers are also movable longitudinally between rearward and forward positions respectively corresponding to the extended and retracted positions thereof so as to displace any such constrained containers and mass thereof being advanced by said conveyor rearwardly and separate the same from any layer of containers then supported by a pallet forwardly of said plungers.

10. The palletizer of claim 1 in which said stop structure is substantially continuous and is turned in longitudinal directions to define the aforesaid ridges and grooves.

11. The palletizer of claim 10 in which said plungers are respectively aligned longitudinally with valleys of said stop structure.

12. The palletizer of claim 11 in which each of said plungers has a tapered lower end to facilitate insertion thereof into such container.

13. The palletizer of claim 12 in which said plungers are also movable longitudinally between rearward and forward positions respectively corresponding to the extended and retracted positions thereof so as to displace any such constrained containers and mass thereof being advanced by said conveyor rearwardly and separate the same from any layer of containers then supported by a pallet forwardly of said plungers.

14. The palletizer of claim 13 in which means are provided that support said interrupter structure for reciprocable displacement between the aforesaid extended and retracted positions such that said plungers traverse generally vertical axes that are longitudinally inclined so that said plungers move downwardly and rearwardly into their extended positions to displace such mass of containers rearwardly as aforesaid.

15. The palletizer of claim 14 in which the angular inclination of said axes is of the order of 30°.

16. The palletizer of claim 13 in which said plungers are respectively aligned longitudinally with valleys of said stop structure, and in which said stop structure and interrupter structure are movable transversely in opposite directions relative to each other in being displaced between the first and second positions thereof.